(12) United States Patent
Ogura et al.

(10) Patent No.: US 7,828,171 B2
(45) Date of Patent: Nov. 9, 2010

(54) CONTAINER HOLDER DEVICE

(75) Inventors: Mitsuo Ogura, Aichi-ken (JP); Kenji Asano, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 459 days.

(21) Appl. No.: 11/702,487

(22) Filed: Feb. 6, 2007

(65) Prior Publication Data
US 2007/0227918 A1    Oct. 4, 2007

(30) Foreign Application Priority Data
Mar. 30, 2006   (JP)   ............... 2006-094602

(51) Int. Cl.
B65D 25/00   (2006.01)
B65D 43/26   (2006.01)
B60R 13/00   (2006.01)
B60N 3/12    (2006.01)

(52) U.S. Cl. ............. 220/737; 220/262; 296/24.34; 296/37.12

(58) Field of Classification Search ............. 297/194, 297/155; 108/25; 220/737, 262; 224/281, 224/926; 296/24.34, 37.12; 248/311.2
See application file for complete search history.

(56) References Cited

U.S. PATENT DOCUMENTS 3,333,721 A  *  8/1967  Marek ................. 220/4.28
3,987,941 A  * 10/1976  Blessing .............. 222/386
4,286,515 A  *  9/1981  Baumann et al. ........ 100/233
4,759,584 A  *  7/1988  Dykstra et al. ........ 297/188.16
5,125,526 A  *  6/1992  Sumanis .............. 220/263
5,520,313 A  *  5/1996  Toshihide ............ 224/539
5,680,974 A  * 10/1997  Vander Sluis ......... 224/281
6,102,343 A  *  8/2000  Grimesey et al. ....... 248/95
6,609,631 B2 *  8/2003  Asami ................ 220/817
6,779,769 B1 *  8/2004  York et al. .......... 248/311.2
6,817,584 B2 * 11/2004  Ogura ............... 248/311.2

FOREIGN PATENT DOCUMENTS

JP   A-2005-306296   11/2005
JP   A-2005-324594   11/2005

* cited by examiner

*Primary Examiner*—Anthony Stashick
*Assistant Examiner*—Kareen Rush
(74) *Attorney, Agent, or Firm*—Posz Law Group, PLC

(57) ABSTRACT

The container holder device includes a rotary body which is fixed to the lid body and held so as to slide up and down with respect to the holder body and so as to rotate, and a guide body which is formed on a side wall of the holder body. The rotary body is engageable with the guide body to rotate, along with the upward and downward sliding movements of the rotary body. Because the rotary body is engageable with the guide body to rotate, along with the upward and downward sliding movements of the rotary body, the rotary body can stably rotate while sliding. Because the lid body will rotate together with the rotary body while sliding, the lid body will move stably between the closed position and the open position. As the results, the moving orbit of the lid body can be made small, and the inner diameter of the storage space can be made small.

6 Claims, 5 Drawing Sheets

CONTAINER HOLDER DEVICE

BACKGROUND OF THE INVENTION

1. Field of the Invention

The present invention relates to a container holder device for storing and holding a container of beverage or the like.

2. Related Art

As a container holder device for storing and holding a container of beverage or the like, a device including a holder body which is formed in a box-like shape having a storage space inside and an opening which opens upward, and a lid body for opening and closing the opening of the holder body has been known. There are a type of the container holder device in which the lid body will move outward of the storage space, when the lid body opens the opening, and another type in which the lid body will sink in the storage space, when the lid body opens the opening. The device in which the lid body will sink in the storage space, when the lid body opens the opening, can be more suitably used as the container holder device to be provided in a vehicle room of an automobile. This is because its outer shape can be made compact, even when a container is stored and held therein.

There is also a type of the container holder device in which the lid body which has sunk in the storage space can be utilized as a receiver for receiving a bottom of the container (Refer to Japanese Patent Publication No. JP-A-2005-324594, for example). In the container holder device which is introduced in JP-A-2005-324594, the lid body will slide up and down with respect to the holder body, and the bottom face of the container will be received by an upper face (a design face) of the lid body. In the container holder device of this type, the bottom face of the container may damage the design face of the lid body, and visual design ability of the container holder device may be deteriorated, in some cases.

There is another type of the container holder device in which the bottom face of the container will be received by a back face of the design face (herein simply referred to as the back face) to prevent the design face from being damaged (Refer to Japanese Patent Publication No. JP-A-2005-306296, for example). The container holder device which is introduced in JP-A-2005-306296 includes two engaging part projected from leg portions of the lid body. The holder body has two guide parts for guiding the two engaging parts. A first guide part which is one of the guide parts extends in a vertical direction, and a second guide part which is the other guide part extends in a circular shape. The first engaging part is slidably engaged with the first guide part, and the second engaging part is slidably engaged with the second guide part. The lid body will rotate around the first engaging part. Moreover, the lid body will slide on a rectilinear line which is guided by the first engaging part and the first guide part. Further, the lid body will rotate along the circular shape which is guided by the second engaging part and the second guide part. Accordingly, the lid body will rotate while it slides up and down, whereby the bottom face of the container can be received by the back face.

By the way, in the container holder device which is introduced in JP-A-2005-306296, the lid body will rotate around the first engaging part, while a rotation direction of the lid body is restricted by the second engaging part and the second guide part in the circular shape. For this reason, for the purpose of obtaining stable rotation of the lid body, it has been necessary to make a radius of the second guide part larger, and also to make a distance between the first engaging part and the second engaging part larger. However, when the distance between the first engaging part and the second engaging part has been made larger, a moving orbit of the lid body will be made larger. Therefore, it has been necessary to make an inner diameter of the storage space larger than a size which has been required for storing the container. In case where the inner diameter of the storage space has been made larger than the size which has been required for storing the container, a small container may rattle in some cases. Further, there has been a problem that downsizing the container holder device would be difficult.

SUMMARY OF THE INVENTION

The invention has been made in view of the above described circumstances, and it is an object of the invention to provide a container holder device in which a bottom face of a container can be received by a back face of a lid body, and an inner diameter of a storage space can be made small.

In order to solve the above described problems, there is provided, according to the invention, a container holder device including a holder body in a box-like shape which opens upward and has a storage space inside, and a lid body having a smaller outer diameter than the storage space, the lid body being moved between a closed position in which the lid body has closed the opening with a design face, which is its one face, directed upward, and an open position in which the lid body has sunk in the storage space to open the opening with the design face directed downward, characterized in that the container holder device has a rotary body which is fixed to the lid body and held so as to slide up and down with respect to the holder body and so as to rotate, a guide body which is formed on a side wall of the holder body, and a driving unit for moving the rotary body in at least one of upward direction and downward direction by sliding, wherein the rotary body is engageable with the guide body to rotate, along with the upward and downward sliding movements of the rotary body.

The container holder device of the invention preferably has at least one of the following structures (1) to (3).

(1) The rotary body has a plurality of rotation protrusions which are arranged at an outer circumferential side of its rotation center, and the guide body has a plurality of guide protrusions which are vertically arranged, wherein a plurality of the rotation protrusions will be sequentially engaged with a plurality of the guide protrusions to rotate the rotary body, when the rotary body slides up and down.

(2) The container holder device includes a slide guide part which is formed on the same side wall of the holder body as the guide body is formed and extends in a vertical direction, and a slide restricting part which is formed on the rotary body, extending coaxially with the rotation center, and adapted to be slidably engaged with the slide guide part.

(3) In addition to the closed position and the open position, the lid body can be arranged in an intermediate open position which is lower than the closed position and upper than the open position, and in which the lid body opens the opening with the design face directed downward.

In the container holder device of the invention, the rotary body is engageable with the guide body to rotate, when the rotary body slides up and down. Therefore, the rotary body can stably rotate while sliding. Because the lid body rotates along with the rotary body, the lid body will move stably between the closed position and the open position. Accordingly, in the container holder device of the invention, the second engaging part and the second guide part in a circular shape as disclosed in JP-A-2005-306296 are not required. As the results, according to the container holder device of the invention, it is possible to make the moving orbit of the lid body small and to make the inner diameter of the storage space small.

In case where the container holder device of the invention has the aforesaid structure (1), a plurality of the rotation protrusions will be sequentially engaged with a plurality of the guide protrusions thereby to rotate the rotary body, when the rotary body slides up and down. Therefore, the lid body will move more stably between the closed position and the open position. Moreover, because the rotary body has a plurality of the rotation protrusions and the guide body has a plurality of the guide protrusions, it is possible to rotate the lid body by 180 degree (or by 180 degree multiplied by an odd number) both at the opening operation and the closing operation, in the container holder device having the simple structure.

In case where the container holder device of the invention has the aforesaid structure (2), it is possible to move the rotary body and the lid body stably in the vertical direction while sliding, by means of the slide guide part and the slide restricting part.

In case where the container holder device of the invention has the aforesaid structure (3), when the lid body is arranged in the intermediate open position, it is possible to receive the container at an upper level, as compared with the case where the lid body is arranged in the open position. In other words, the container holder device of the invention having the aforesaid structure (3) can receive the container by the back face of the lid body at different positions in the vertical direction. Therefore, in this case, the container holder device of the invention can be advantageously applied to the containers having various heights.

DETAILED DESCRIPTION OF THE PREFERRED EMBODIMENTS

Figure 1:
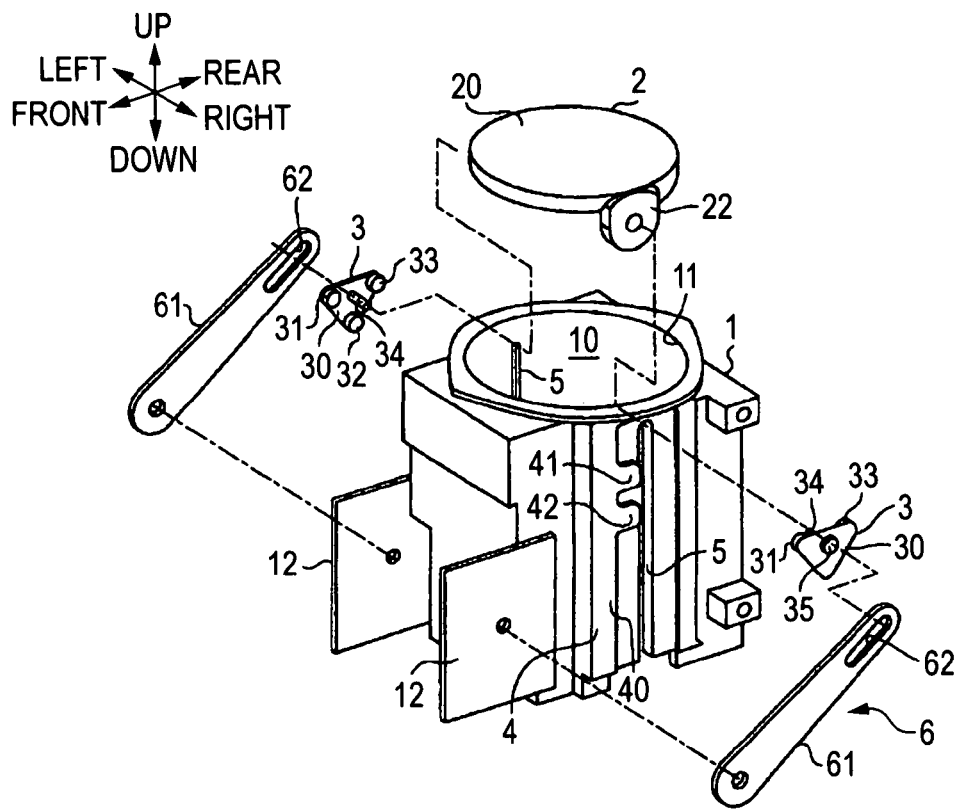
FIG. 1 is an exploded perspective view schematically showing a container holder device in Embodiment 1.

In the container holder device of the invention, it would be sufficient that the lid body will close the opening with the design face directed upward in the closed position. In the closed position, an entirety of the lid body may be exposed above the storage space, a part of the lid body may be exposed above the storage space while the other part of the lid body sinks in the storage space, or the entirety of the lid body may sink in the storage space. In order to make the container holder device compact and excellent in design ability too, it would be preferable that the design face of the lid body is substantially at the same level as the upper face of the holder body in the closed position.

In the container holder device of the invention, the rotary body is fixed to the lid body. The rotary body and the lid body will move integrally. The rotary body and the lid body may be integrally formed, or may be separately formed and then, fixed to each other by a known method such as bonding, welding, fitting, and screwing.

In case where the rotary body has a plurality of the rotation protrusions, the rotation protrusions are formed in a convex shape and arranged at the outer circumferential side of the rotation center of the rotary body. A plurality, that is, two or more of the rotation protrusions may be formed, and the number of the rotation protrusions is not particularly defined. A distance between the adjacent rotation protrusions may be constant, or may not be constant. Moreover, distances between the respective rotation protrusions and the rotation center may be equal or may not be equal.

In the container holder device of the invention, the guide body is formed on the holder body. The guide body may be integrally formed on the holder body, or may be separately formed, and then, integrally fixed to the holder body by a known method. In case where the guide body has a plurality of the guide protrusions, the guide protrusions are formed in a convex shape and vertically arranged. A plurality, that is, two or more of the guide protrusions may be formed, and the number of the guide protrusions is not particularly defined. A distance between the adjacent guide protrusions may be constant, or may not be constant.

In the container holder device of the invention, the rotation center of the rotary body may be directly held on the holder body so as to slide and so as to rotate. Alternatively, the rotary center may be held on the holder body so as to slide and rotate, by way of the guide body.

In the container holder device of the invention, the driving unit may move the rotary body by sliding in at least one of upward direction and downward direction. As the driving unit, a known structure capable of moving the rotary body by sliding can be employed. The driving unit may automatically move the rotary body by sliding. In this case, the driving unit may be provided with a drive source such as an electric motor, a piston-cylinder mechanism, and a solenoid. In case of employing the drive source of a rotary type such as the electric motor, the driving unit may be provided with a converter for converting the rotary movement of the drive source to a linear movement in the vertical direction. Alternatively, the driving unit may manually move the rotary body by sliding. In this case, the driving unit may be provided with an input part (for example, a lever or a rotary knob) which will be operated by the user and a transmitting device (for example, a rack and pinion mechanism) for transmitting the operation of the input part to the rotary body.

The driving unit may move the rotary body by sliding in only one of the upward direction and the downward direction. For example, a urging member such as a spring may be used to urge the rotary body upward. In this case, the lid body will be driven by the driving unit to move to the closed position. In order to move the lid body to the open position, the user will push the lid body into the storage space by hand, and the rotary body will slide downward together with the lid body. In this case, a locking device for locking the lid body in the open position may be provided. Alternatively, the rotary body and the lid body may be so constructed as to move downward by sliding by a weight of the lid body itself. In order to move the lid body to the closed position, the rotary body may be slid upward by either of the driving unit which have been described above.

EMBODIMENTS

Now, a device for opening and closing the lid body in the invention will be described referring to the drawings.

Embodiment 1

Figure 2:
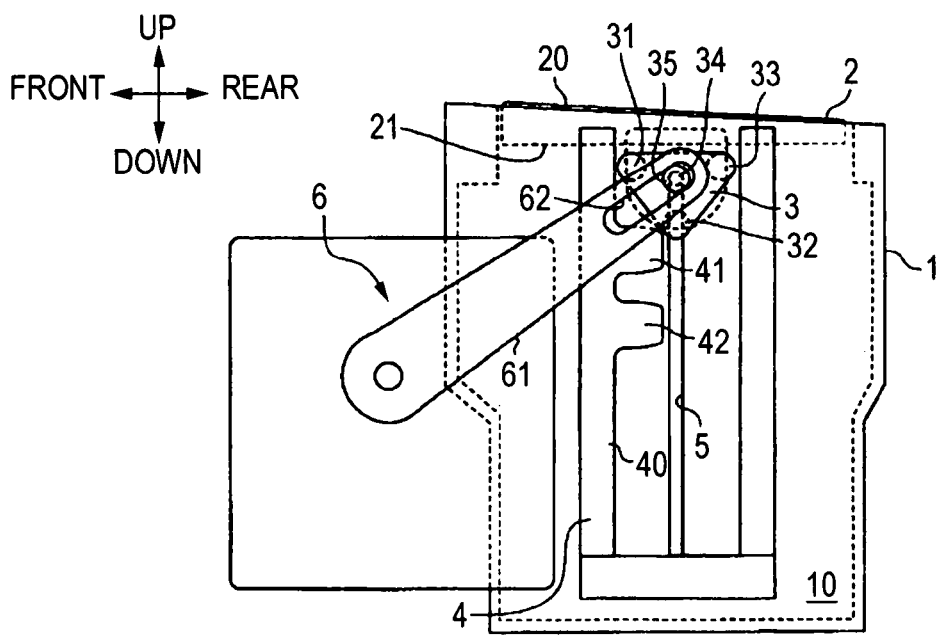
FIG. 2 is a side view schematically showing the container holder device in Embodiment 1.
Figure 3:
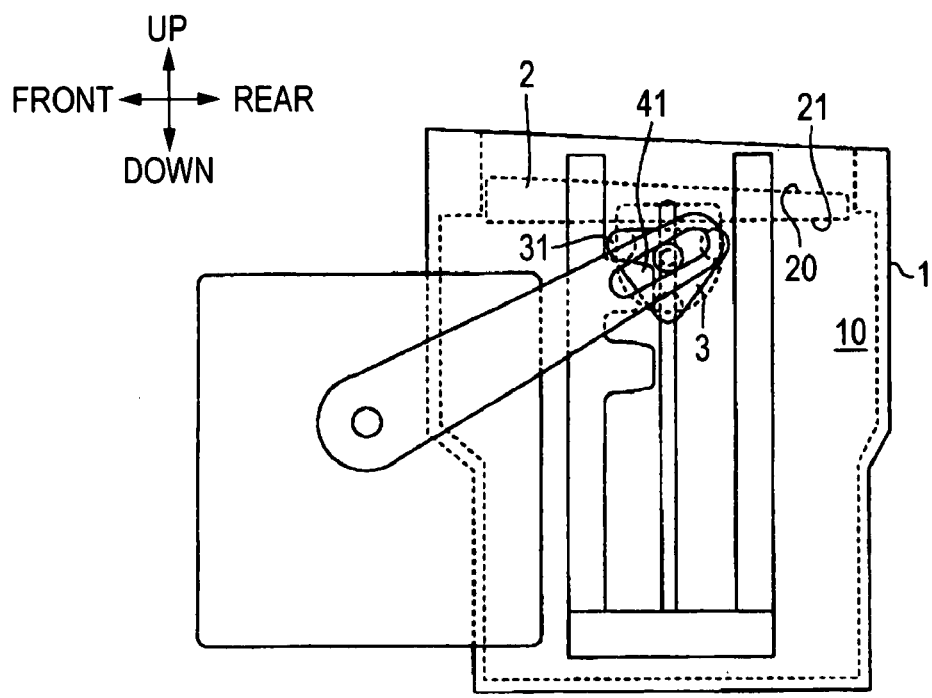
FIG. 3 is a side view schematically showing the container holder device in Embodiment 1.
Figure 4:
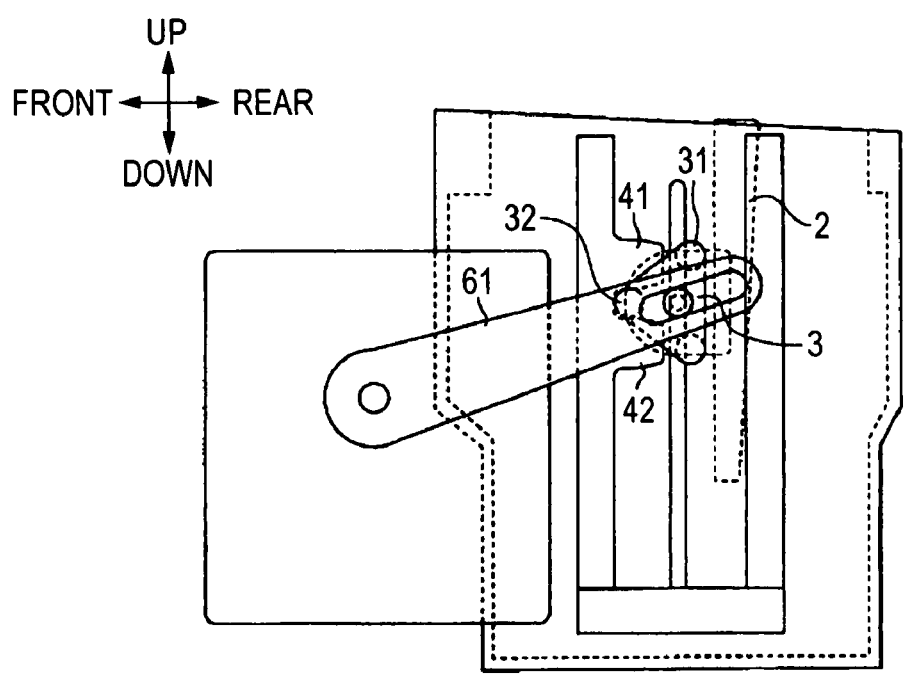
FIG. 4 is a side view schematically showing the container holder device in Embodiment 1.
Figure 5:
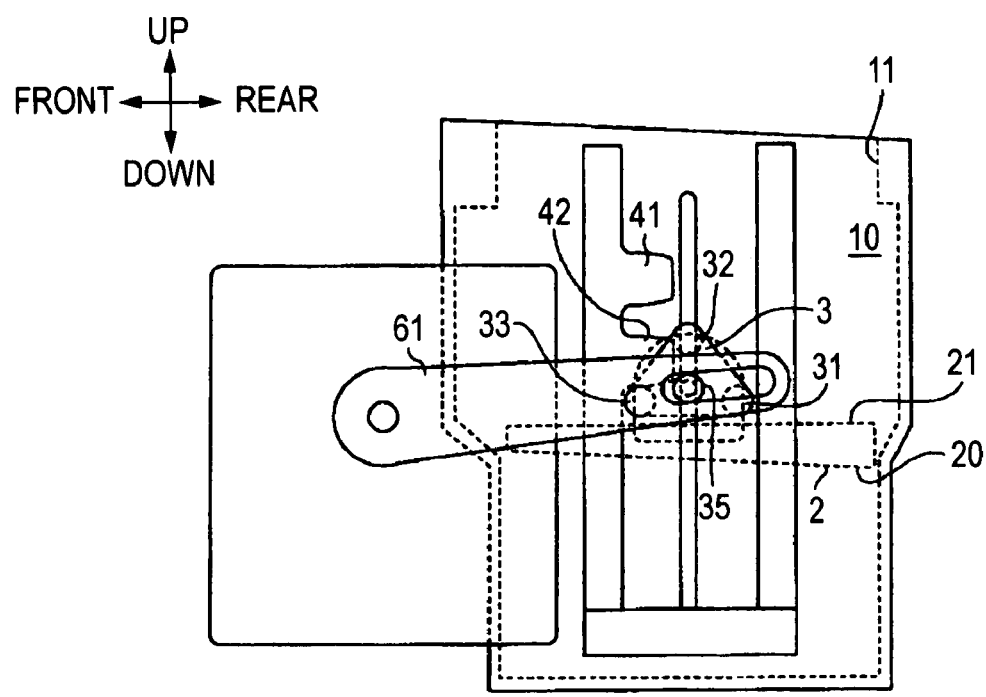
FIG. 5 is a side view schematically showing the container holder device in Embodiment 1.
Figure 6:
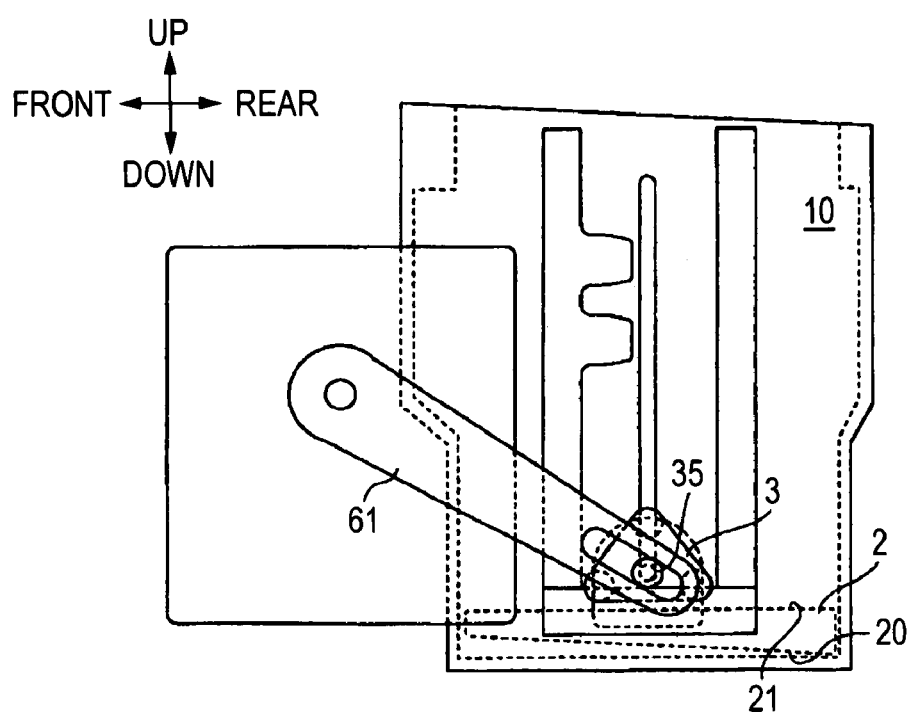
FIG. 6 is a side view schematically showing the container holder device in Embodiment 1.

A container holder device in Embodiment 1 is of a type to be disposed in a consol box of an automobile, and provided with the above described structures (1) to (3). FIG. 1 is an exploded perspective view schematically showing the container holder device in Embodiment 1. FIGS. 2 to 6 are side views schematically showing the container holder device in Embodiment 1. Specifically, in FIG. 2, a lid body is shown in a state arranged in a closed position. In FIGS. 3 and 4, the lid body is shown in a state shifted from the closed position to a first open position. In FIG. 5, the lid body is shown in a state arranged in the first open position. In FIG. 6, the lid body is shown in a state arranged in a second open position. In the following description of Embodiment 1, directions up and down, right and left, and front and back will designate the same directions as shown in FIG. 1.

The container holder device in Embodiment 1 includes a holder body 1, a lid body 2, a pair of rotary bodies 3, a pair of guide bodies 4, a pair of slide guide parts 5, and a driving unit 6. The holder body 1 has a substantially box-like shape which opens upward. A storage space 10 is formed inside the box, that is, inside of the holder body 1. Right and left side walls of the holder body 1 are respectively provided with the guide bodies 4 and the slide guide parts 5. Each of the guide bodies 4 includes a guide base part 40 in a plate-like shape extending in a vertical direction, a first guide protrusion 41 in a strip shape which projects backward from an upper position of the guide base part 40, and a second guide protrusion 42 in a strip shape which projects backward from the guide base part 40 at a position lower than the first guide protrusion 41. Each of the slide guide parts 5 is positioned backward of the guide body 4, and formed as a groove extending in the vertical direction and communicating an inside of the storage space 10 to an outside.

The lid body 2 has a substantially disc-like shape, and includes a design face 20 which is one surface, and a back face 21 which is a reverse side of the design face 20. In addition, the lid body 2 has a pair of leg portions 22 provided on a peripheral edge part thereof and extending toward the back face 21. An outer diameter of the lid body 2 is smaller than a diameter of an opening 11 of the storage space 10. As shown in FIG. 2, the lid body 2 is fixed to the rotary bodies 3 and held inside the storage space 10.

The rotary bodies 3 are respectively held on outer peripheral faces of the right and left side walls of the holder body 1. Each of the rotary bodies 3 has a rotation base part 30 in a substantially triangular shape, three rotation protrusions (a first rotation protrusion 31, a second rotation protrusion 32 and a third rotation protrusion 33), a slide restricting part 34, and an input end part 35. Both the slide restricting part 34 and the input end part 35 have a substantially columnar shape. The slide restricting part 34 extends inward from an inner face of the rotation base part 30, and the input end part 35 extends outward from an outer face of the rotation base part 30. Both the slide restricting parts 34 and the input end part 35 extend coaxially with a rotation center of the rotary body 3. The slide restricting parts 34 are respectively inserted into the slide guide parts 5, and respective distal ends thereof protrude into the storage space 10. Then, the distal ends of the slide restricting parts 34 are respectively fixed to the leg portions 22 of the lid body 2.

The first rotation protrusion 31, the second rotation protrusion 32 and the third rotation protrusion 33 protrude inward from an inner face of the rotation base part 30. The first rotation protrusion 31, the second rotation protrusion 32 and the third rotation protrusion 33 are arranged at an outer circumferential side of the rotation center of the rotary body 3. Distances between the respective rotation protrusions and the rotation center of the rotary body 3 are equal. Specifically, the first rotation protrusion 31 and the third rotation protrusion 33 are arranged at positions close to the back face 21 of the lid body 2. The second rotation protrusion 32 is arranged at a position remote from the back face 21 of the lid body 2, as compared with the first rotation protrusion 31 and the third rotation protrusion 33. Distal ends of the three rotation protrusions are arranged outside of the right and left side walls of the holder body 1. The rotary body 3 is held so as to slide and so as to rotate with respect to the holder body 1, in such a manner that at least one of the rotation protrusion may be arranged forward of the distal ends of the first guide protrusion 41 and the second guide protrusion 42.

A pair of drive holding parts 12 in a plate-like shape extending frontward are respectively formed on the right and left side walls of the holder body 1. Drive arms 61 in an elongated plate-like shape are respectively and pivotally held by the drive holding parts 12. Each of the drive arms 61 is formed with a drive guide part 62 in a shape of an elongated hole, at a distal end part thereof. The input end part 35 of the rotary body 3 is slidably engaged with the drive guide part 62. The two drive arms 61 are connected to an electric motor which is not shown. More specifically, pivotal shafts of the two drive arms 61 are fixed to an arm side gear which is not shown. The electric motor can rotate in two directions, namely, a positive direction and a reverse direction. A motor side gear which is not shown is fixed to a rotation shaft of the electric motor. The motor side gear is in mesh with the arm side gear. When the electric motor rotates in the positive direction, the arm side gear will rotate in a counterclockwise direction in FIG. 1, whereby the drive arms 61 will move upward. When the electric motor rotates in the reverse direction, the arm side gear will rotate in a clockwise direction in FIG. 1, whereby the drive arms 61 will move downward. Controller which is not shown is connected to the electric motor. The controller is connected to a switch which is not shown, and will receive a signal from the switch thereby to rotate the electric motor in the positive direction or in the reverse direction. In the container holder device in Embodiment 1, the drive arms 61, the arm side gear, the motor side gear, and the electric motor constitute the driving unit 6. In the container holder device in Embodiment 1, when the lid body 2 is arranged in the closed position, which will be described below, the controller will move the lid body 2 to an intermediate open position, which will be described below, by way of the driving unit 6. When the lid body 2 is arranged in the intermediate open position, the controller will move the lid body 2 to an open position, which will be described below, by way of the driving unit 6. When the lid body 2 is arranged in the open position, the controller will move the lid body 2 to the closed position by way of the driving unit 6. Operation of the container holder device in Embodiment 1 will be described hereunder.

In a state where the lid body 2 is arranged in the closed position (FIG. 2), the first rotation protrusion 31 of the rotary body 3 is positioned above the first guide protrusion 41. The third rotation protrusion 33 is positioned backward above the distal end of the first guide protrusion 41. The second rotation protrusion 32 is positioned below the first and third rotation protrusions 31, 33 and backward above the distal end of the first guide protrusion 41. The slide restricting part 34 is positioned at an upper end of the slide guide part 5.

When a user has operated the switch, which is not shown, while the lid body 2 is in the closed positions the controller will move the lid body 2 from the closed position to the intermediate open position by way of the driving unit 6. Specifically, the electric motor will rotate in the reverse direction, whereby the drive arm 61 will move downward. By the downward movement of the drive arm 61, the input end part 35 will be pressed downward, and the rotary body 3 will move downward by sliding. The lid body 2 will also move downward by sliding together with the rotary body 3, and will sink in the storage space 10 (FIG. 3). When the rotary body 3 has moved downward by sliding, the first rotation protrusion 31 will be butted against an upper face of the first guide protrusion 41. The first rotation protrusion 31 is engageable with the upper face of the first guide protrusion 41, whereby the rotary body 3 will rotate by 90 degree in a clockwise direction (FIG. 4).

When the rotary body 3 has rotated by 90 degree in the clockwise direction, the first rotation protrusion 31 will move backward beyond the distal end of the first guide protrusion 41, and the second rotation protrusion 32 will enter between the first guide protrusion 41 and the second guide protrusion 42. Consequently, the drive arm 61 will move downward to move the rotary body 3 further downward by sliding, and the second rotation protrusion 32 will be engaged with an upper face of the second guide protrusion 42, whereby the rotary body 3 will rotate by 90 degree in the clockwise direction (by 180 degree in the clockwise direction from the closed position) (FIG. 5).

When the rotary body 3 has rotated by 180 degree in the clockwise direction, the first rotation protrusion 31 and the second rotation protrusion 32 will move backward beyond the distal end of the second guide protrusion 42, and the third rotation protrusion 33 will enter below the second guide protrusion 42. On this occasion, the lid body 2 will sink in the storage space 10 thereby to open the opening 11, and at the same time, the design face 20 will be directed downward while the back face 21 will be directed upward.

In the container holder device in Embodiment 1, after the rotary body 3 has rotated by 180 degree in the clockwise direction from the closed position, the electric motor will be stopped. As the results, the lid body 2 will be fixed in a state sunk in the storage space 10 to open the opening 11, having the design face 20 directed downward and the back face 21 directed upward. The position of the lid body 2 at this moment is a so-called intermediate open position in this invention.

When the user has operated the switch again, while the lid body 2 is arranged in the intermediate open position as shown in FIG. 5, the controller will move the lid body 2 to the open position by way of the driving unit 6. Specifically, the electric motor will be rotated again in the reverse direction to move the drive arm 61 downward. Then, the input end part 35 will be pressed downward by the drive arm 61, and the rotary body 3 will move downward by sliding. On this occasion, the lid body 2 will move downward by sliding together with the rotary body 3, having the design face 20 directed downward and the back face 21 directed upward (FIG. 6). In the container holder device in Embodiment 1, when the lid body 2 has moved up to a bottom part of the storage space 10, the electric motor will be stopped again. As the results, the lid body 2 will be fixed having the design face 20 directed downward and the back face 21 directed upward. The position of the lid body 2 at this moment is the open position in this invention.

When the user has operated the switch again, while the lid body 2 is arranged in the open position, the controller will move the lid body 2 to the closed position by way of the driving unit 6. Specifically, the electric motor will rotate in the positive direction to move the drive arm 61 upward. The drive arm 61 which has moved upward will push the input end part 35 upward, thereby to slide the rotary body 3 and the lid body 2 upward. As the results, the lid body 2 will move to the intermediate open position as shown in FIG. 5, and the third rotation protrusion 33 of the rotary body 3 will be butted against a lower face of the second guide protrusion 42. The electric motor will continue to rotate in the positive direction. Accordingly, the drive arm 61 will further move upward to push the input end part 35 upward, and the rotary body 3 and the lid body 2 will further slide upward. The third rotation protrusion 33 is engageable with the lower face of the second guide protrusion 42, whereby the rotary body 3 will rotate by 90 degree in the counterclockwise direction. Accordingly, the lid body 2 will move up to the position as shown in FIG. 4. On this occasion, the second rotation protrusion 32 will enter between the second guide protrusion 42 and the first guide protrusion 41. The electric motor will continue to rotate in the positive direction, and the drive arm 61 will further move upward. The second rotation protrusion 32 is engageable with the lower face of the first guide protrusion 41, whereby the rotary body 3 will further rotate by 90 degree in the counterclockwise direction (by 180 degree in the counterclockwise direction from the open position). Consequently, the lid body 2 will move up to the position as shown in FIG. 3, having the design face 20 directed upward and the back face 21 directed downward. Because the electric motor will continue to rotate in the positive direction, the drive arm 61 will further move upward, and the lid body 2 will slide upward having the design face 20 directed upward and the back face 21 directed downward to move up to the closed position as shown in FIG. 2. Then, the electric motor will be stopped, and the lid body 2 will be fixed in the closed position.

In the container holder device in Embodiment 1, along with the upward and downward sliding movements of the rotary body 3, the first rotation protrusion 31, the second rotation protrusion 32, and the third rotation protrusion 33 will be sequentially engaged with the first guide protrusion 41 and the second guide protrusion 42 to rotate the rotary body 3. Therefore, the lid body 2 will stably move between the closed position and the open position. According to the container holder device in Embodiment 1, a moving orbit of the lid body 2 can be made small and the inner diameter of the storage space can be made small.

Moreover, the rotary body 3 has the three rotation protrusions (31, 32, 33) and the guide body 4 has the two guide protrusions (41, 42). Accordingly, the rotary body 3 and the lid body 2 will rotate by 180 degree, both at the opening operation and the closing operation. Therefore, the lid body 2 which has moved to the closed position will make the design face 20 directed upward, and the lid body 2 which has moved to the open position will make the design face 20 downward. As the results, the lid body 2 which has moved to the open position can receive the bottom face of the container by the back face 21.

In the container holder device in Embodiment 1, the lid body 2 will move from the closed position, through the intermediate open position, to the open position. While the lid body 2 is arranged in the intermediate open position, it is possible to receive the container at an upper level than the case where the lid body is arranged in the closed position as shown in FIG. 6. Consequently, in the container holder device in Embodiment 1, it is possible to receive the container by the back face 21 of the lid body 2 at different positions in the vertical direction, and to deal with the containers having various sizes.

In the container holder device in Embodiment 1, the outer diameter of the lid body 2 is smaller than the diameter of the opening 11. However, the diameter of the lid body 2 may be larger than the diameter of the opening 11, provided that the lid body 2 has a smaller outer diameter than the storage space 10 and can sink in the storage space 10.

Embodiment 2

Figure 7:
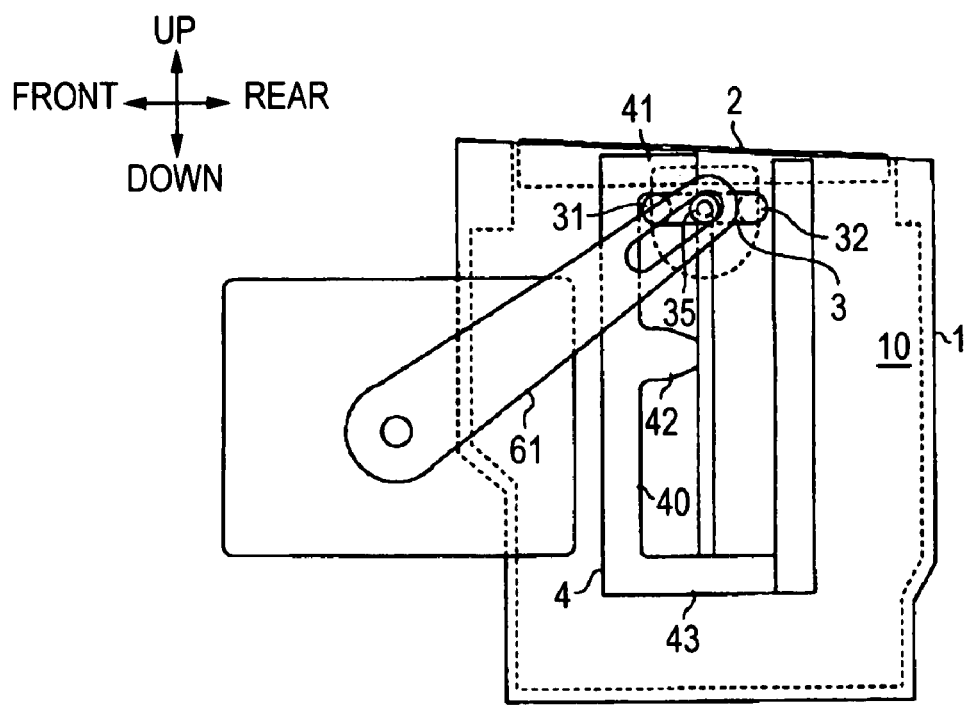
FIG. 7 is a side view schematically showing a container holder device in Embodiment 2.
Figure 8:
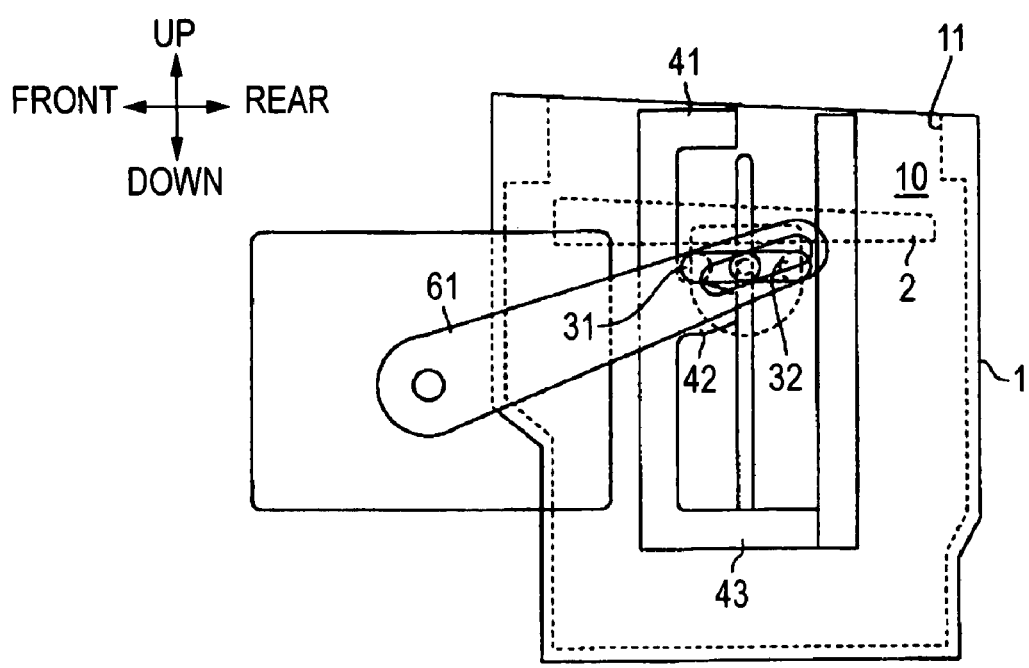
FIG. 8 is a side view schematically showing the container holder device in Embodiment 2.
Figure 9:
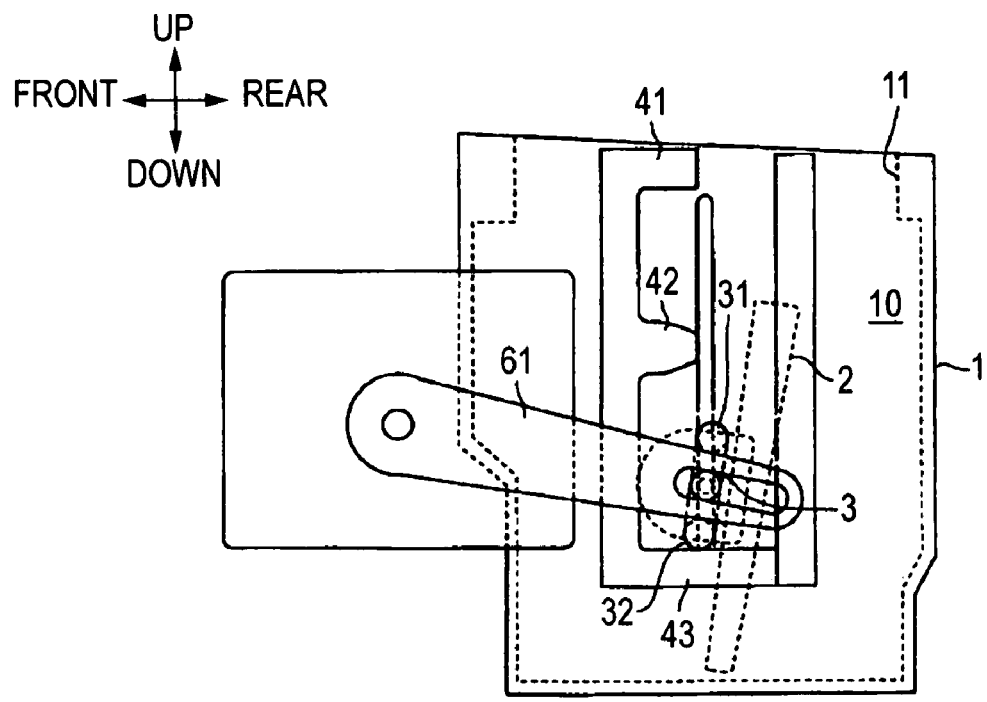
FIG. 9 is a side view schematically showing the container holder device in Embodiment 2.
Figure 10:
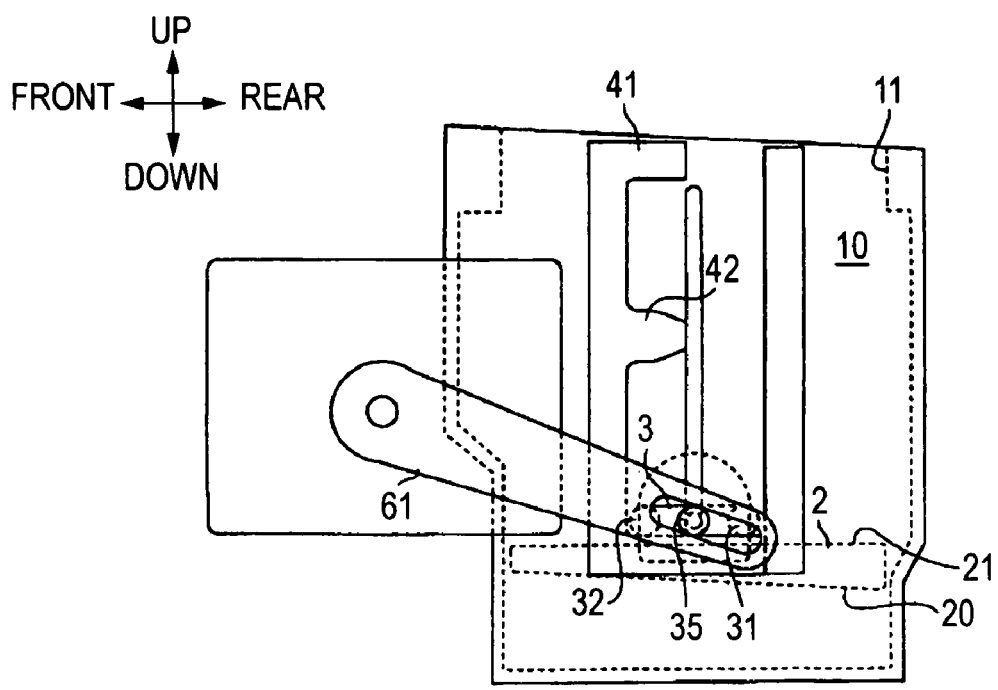
FIG. 10 is a side view schematically showing the container holder device in Embodiment 2.

A container holder device in Embodiment 2 is substantially the same as the container holder device in Embodiment 1, except that shapes of the rotary body and the guide body are different. The container holder device in Embodiment 2 has the above described structures (1) and (2). FIGS. 7 to 10 are side views schematically showing the container holder device in Embodiment 2. Specifically, FIG. 7 shows the lid body in a state arranged in the closed position. FIGS. 8 and 9 show the lid body in a state shifted from the closed position to the open position. FIG. 10 shows the lid body in a state arranged in the open position.

In the container holder device in Embodiment 2, the rotary body 3 has two rotation protrusions (a first rotation protrusion 31 and a second rotation protrusion). The first rotation protrusion 31 in the container holder device in Embodiment 2 has the same shape and is arranged at the same position as the first rotation protrusion 31 in the container holder device in Embodiment 1. The second rotation protrusion 32 in the container holder device in Embodiment 2 has the same shape and is arranged at the same position as the third rotation protrusion 33 in the container holder device in Embodiment 1.

In the container holder device in Embodiment 2, the guide body 4 has three guide protrusions (a first guide protrusion 41, a second guide protrusion 42, and a third guide protrusion 43). All of the first guide protrusion 41, the second guide protrusion 42, and the third guide protrusion 43 extend backward from the guide base part 40. The first guide protrusion 41 is disposed at an upper end of the guide base part 40, and the third guide protrusion 43 is disposed at a lower end of the guide base part 40. The second guide protrusion 42 is disposed at the position between the first guide protrusion 41 and the third guide protrusion 43.

The container holder device in Embodiment 2 has the same driving unit 6 as the container holder device in Embodiment 1. In the container holder device in Embodiment 2, when the lid body 2 is arranged in the closed position, the controller will move the lid body 2 to the open position by way of the driving unit 6. When the lid body 2 is arranged in the open position, the controller will move the lid body 2 to the closed position by way of the driving unit 6. Operation of the container holder device in Embodiment 2 will be described below.

When the lid body 2 is arranged in the closed position (FIG. 7), the first rotation protrusion 31 of the rotary body 3 is arranged below the first guide protrusion 41. The second rotation protrusion 32 is arranged backward below a distal end of the first guide protrusion 41.

When the user has operated the switch, which is not shown, while the lid body 2 is in the closed position, the controller will move the lid body 2 from the closed position to the open position by way of the driving unit 6. Specifically, the electric motor will rotate in the reverse direction, whereby the drive arm 61 will move downward to push the input end part 35 downward. Consequently, the rotary body 3 will move downward by sliding, and the lid body 2 will also move downward by sliding together with the rotary body 3, thereby to sink in the storage space 10 (FIG. 8). When the rotary body 3 has moved downward by sliding, the first rotation protrusion 31 will be butted against an upper face of the second guide protrusion 42. The first rotation protrusion 31 is engageable with the upper face of the second guide protrusion 42, whereby the rotary body 3 will rotate by 100 degree in the clockwise direction. On this occasion, the first rotation protrusion 31 will move backward beyond a distal end of the second guide protrusion 42, and the second rotation protrusion 32 will enter between the second guide protrusion 42 and the third guide protrusion 43. In this state, as the drive arm 61 will move downward and the rotary body 3 will move further downward by sliding, the second rotation protrusion 32 will be butted against an upper face of the third guide protrusion 43 (FIG. 9). The second rotation protrusion 32 is engageable with the third guide protrusion 43, and the rotary body 3 will further rotate in the clockwise direction (by 180 degree in the clockwise direction from the closed position). On this occasion, the lid body 2 will sink in the storage space 10 to open the opening 11, having the design face 20 directed downward and the back face 21 directed upward (FIG. 10). In the container holder device in Embodiment 2, when the rotary body 3 has rotated by 180 degree in the clockwise direction from the closed position, the electric motor will be stopped. As the results, the lid body 2 will be fixed in a state sunk in the storage space 10 to open the opening, having the design face 20 directed downward and the back face 21 directed upward. In short, the lid body 2 will be fixed in the closed position.

When the user has operated the switch again, while the lid body 2 is arranged in the open position, the controller will move the lid body 2 to the closed position by way of the driving unit 6. Specifically, the electric motor will rotate in the positive direction to move the drive arm 61 upward. The input end part 35 will be pushed upward by the drive arm 61, and the rotary body 3 will move upward by sliding. As the results, the second rotation protrusion 32 will be butted against the lower face of the second guide protrusion 42. The second rotation protrusion 32 is engageable with the lower face of the second guide protrusion 42, whereby the rotary body 3 will rotate by 100 degree in the counterclockwise direction.

When the drive arm 61 has further moved upward, the rotary body 3 will further move upward by sliding, and the first rotation protrusion 31 will be butted against the lower face of the first guide protrusion 41. The first rotation protrusion 31 is engageable with the lower face of the first guide protrusion 41, and the rotary body 3 will rotate in the counterclockwise direction (by 180 degree in the counterclockwise direction from the open position). Consequently, the lid body 2 will make the design face 20 directed upward and the back face 21 directed downward. Then, the electric motor will be stopped, and the lid body 2 will be fixed in the closed position as shown in FIG. 7.

In the container holder device in Embodiment 2, the rotary body 3 has the two rotation protrusions (31, 32) and the guide body 4 has the three guide protrusions (41, 42, 43). Along with the upward and downward sliding movements of the rotary body 3, the first rotation protrusion 31 and the second rotation protrusion 32 will be sequentially engaged with the first guide protrusion 41, the second guide protrusion 42, and the third guide protrusion 43, thereby to rotate the rotary body 3. Therefore, the lid body 2 will stably move between the closed position and the open position. According to the container holder device in Embodiment 2, the moving orbit of the lid body 2 can be made small and the inner diameter of the storage space can be made small.

In the container holder device in Embodiment 1, the rotary body 3 has the three rotation protrusions, and in the container holder device in Embodiment 2, the rotary body 3 has the two rotation protrusions. However, the rotary body 3 may have four or more rotation protrusions in the container holder device according to the invention. The guide body 4 also may have four or more guide protrusions. For example, it is possible to form the rotary body 3 in a shape having a number of rotation protrusions (in a so-called pinion shape), and to form the guide body 4 in a shape having a number of guide protrusions (in a so-called rack shape). In this case too, when the rotary body 3 slides up and down, a plurality of the rotation protrusions will be sequentially engaged with a plurality of the guide protrusions to rotate the rotary body 3. Accordingly, in this case too, the moving orbit of the lid body 2 can be made small, and the inner diameter of the storage space 10 can be made small.

In the container holder devices both in Embodiment 1 and Embodiment 2, the rotary body 3 rotates by 180 degree respectively at the opening operation and the closing operation. However, the rotary body 3 may make any number of rotations, provided that the number is a multiple of 180 degree by an odd number.

What is claimed is:

1. A container holder device comprising:
   a holder body having a storage space, an upward opening located at an end of the storage space, and a slide guide part extending along the storage space,
   a lid body having a design face and movably stored in the storage space;
   at least one rotary body including a plate body, at least one rotation projection projecting on the plate body, a pin extending from a first face of the plate body and an end part extending from a second face of the plate body and coaxial with the pin, wherein the pin is inserted into the slide guide part to be connected to the lid body in the storage space, and the end part is inserted into the elongated hole of the arm to engage with the arm in a sliding manner,
   at least one arm having an elongated hole at a first end thereof to support the at least one rotary body, wherein the at least one arm is pivotally held at a second end thereof, and
   a guide base part provided along the storage space and having at least one guiding protrusion that is engageable with the at least one rotation projection,
   wherein the lid body rotates integrally with the rotary body by 180° when the pin slides along the slide guide part.

2. A container holder device according to claim 1, wherein the rotary body has a plurality of rotation protrusions, which are arranged at an outer circumferential side of the pin,
   the guide body has a plurality of guide protrusions, which are vertically arranged, and
   the plurality of rotation protrusions is sequentially engageable with a plurality of the guide protrusions to rotate the rotary body, when the rotary body moves up and down.

3. A container holder device according to claim 1, wherein the arm is connected to an electric motor at the second end thereof.

4. A container holder device comprising:
   a holder body in which a storage space is formed;
   an opening defined by the holder body at an upper end of the storage space;
   a slide guide part extending vertically along a sidewall of the holder body,
   a lid for covering the opening, wherein the lid is movable within the storage space and has a design face and a back face, which are opposite to one another;
   at least one rotary body, wherein the rotary body includes:
   a first face and a second face, wherein the first face is opposite to the second face;
   at least one rotation projection projecting from the plate body;
   a pin extending from the first face; and
   an end part extending from the second face of the plate body, wherein the end part is coaxial with the pin, and wherein the pin is fitted into the slide guide part and engaged with the lid body in the storage space;
   at least one arm having a first end and a second end, which are opposite to one another, wherein an elongated hole is formed at the first end of the arm to support the rotary body, the second end of the arm is pivotally supported, and the end part is fitted into the elongated hole of the arm to engage with the arm in a sliding manner; and
   a guide base part provided on the holder body at a side of the storage space, wherein the guide base part has at least one guiding protrusion that engages with the rotation projection and causes the lid to pivot within the storage space when the arm is pivoted,
   wherein the lid body rotates integrally with the rotary body by 180° when the pin slides along the slide guide part.

5. A container holder device according to claim 4, wherein the rotation protrusion is one of a plurality of rotation protrusions on the rotary body, and
   the rotation protrusions are arranged outwardly of the pin,
   the guide part has a plurality of guide protrusions, which are vertically arranged, and
   the plurality of rotation protrusions engage the guide protrusions, respectively, to rotate the rotary body, when the arm is pivoted.

6. A container holder device according to claim 4, wherein the lid is constructed and arranged to move from an upper position within the storage space, at which is covers the opening, and a lower position within the storage space, when the arm pivots from an upper position to a lower position, and wherein the design face faces generally upward in the upper position of the lid, and the design face faces generally downward in the lower position of the lid.

* * * * *